United States Patent
Tandon et al.

(10) Patent No.: US 12,401,852 B2
(45) Date of Patent: *Aug. 26, 2025

(54) COMPUTING DEVICE UPGRADING SYSTEM OVER A WIRELESS NETWORK

(71) Applicant: Roku, Inc., San Jose, CA (US)

(72) Inventors: Prateek Tandon, San Jose, CA (US); Cameron Esfahani, Austin, TX (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,126

(22) Filed: Mar. 11, 2024

(65) Prior Publication Data

US 2024/0214635 A1  Jun. 27, 2024

Related U.S. Application Data

(63) Continuation of application No. 18/137,479, filed on Apr. 21, 2023, now Pat. No. 11,962,853, which is a
(Continued)

(51) Int. Cl.
*H04N 21/2387* (2011.01)
*H04N 21/258* (2011.01)
(Continued)

(52) U.S. Cl.
CPC ... *H04N 21/4586* (2013.01); *H04N 21/43635* (2013.01); *H04N 21/443* (2013.01)

(58) Field of Classification Search
None
See application file for complete search history.

(56) References Cited

U.S. PATENT DOCUMENTS

| 11,190,842 B2 | 11/2021 | Tandon et al. |
| 11,317,152 B2 | 4/2022 | Tandon et al. |

(Continued)

FOREIGN PATENT DOCUMENTS

| KR | 20040044236 A | 5/2004 |
| KR | 20060027170 A | 3/2006 |

OTHER PUBLICATIONS

European Search Report directed to related European Application No. 19771816.6, mailed on Aug. 6, 2021; 8 pages.
(Continued)

*Primary Examiner* — Fernando Alcon
*Assistant Examiner* — Jean D Saint Cyr
(74) *Attorney, Agent, or Firm* — Sterne, Kessler, Goldstein & Fox P.L.L.C.

(57) ABSTRACT

Disclosed herein are system, method, and computer program product embodiments for a computing device upgrading system over a wireless network. An embodiment operates by determining that a computing device is connected to an upgrader device over a wireless network connection. It is determined that an upgrader mode of the computing device is activated based on the determination that the wireless network connection to the upgrader device is active. A command at is received at the computing device. It is determined that a speed of the wireless network connection exceeds a threshold. The command is transmitted to the upgrader device based on both the determination that the upgrader mode of the computing device is active and the determination that the speed of the wireless network connection exceeds the threshold. At the computing device, a response from the upgrader device executing the command is received, and content is output.

20 Claims, 5 Drawing Sheets

Related U.S. Application Data continuation of application No. 17/699,733, filed on Mar. 21, 2022, now Pat. No. 11,665,400, which is a continuation of application No. 16/700,600, filed on Dec. 2, 2019, now Pat. No. 11,317,152, which is a continuation-in-part of application No. 16/357,740, filed on Mar. 19, 2019, now Pat. No. 11,399,213.

(60) Provisional application No. 62/646,994, filed on Mar. 23, 2018, provisional application No. 62/900,919, filed on Sep. 16, 2019.

(51) Int. Cl.
*H04N 21/262* (2011.01)
*H04N 21/418* (2011.01)
*H04N 21/436* (2011.01)
*H04N 21/4363* (2011.01)
*H04N 21/442* (2011.01)
*H04N 21/443* (2011.01)
*H04N 21/45* (2011.01)
*H04N 21/458* (2011.01)

(56) References Cited

U.S. PATENT DOCUMENTS

| | | | |
|---|---|---|---|
| 11,399,213 | B2 | 7/2022 | Mendenhall et al. |
| 11,665,400 | B2 | 5/2023 | Tandon et al. |
| 2007/0299858 | A1 | 12/2007 | Norcott |
| 2008/0208908 | A1 | 8/2008 | Kashyap et al. |
| 2009/0077549 | A1 | 3/2009 | Sadja et al. |
| 2010/0011404 | A1 | 1/2010 | Douillet et al. |
| 2011/0078717 | A1 | 3/2011 | Drummond et al. |
| 2012/0260049 | A1 | 10/2012 | Yao et al. |
| 2013/0152135 | A1 | 6/2013 | Hong et al. |
| 2013/0169604 | A1* | 7/2013 | Cho ............... H04N 21/4854 345/204 |
| 2013/0169873 | A1* | 7/2013 | Lee ............... H04N 21/8166 348/553 |
| 2013/0174042 | A1 | 7/2013 | Kim et al. |
| 2013/0194246 | A1* | 8/2013 | Na ............... H04N 21/4183 345/211 |
| 2013/0194500 | A1 | 8/2013 | Na et al. |
| 2013/0194502 | A1* | 8/2013 | Kim ............... G06F 8/65 348/554 |
| 2013/0258195 | A1 | 10/2013 | Chung et al. |
| 2013/0258204 | A1 | 10/2013 | Chung et al. |
| 2015/0046968 | A1* | 2/2015 | Lee ............... H04N 21/8173 725/132 |
| 2015/0289015 | A1* | 10/2015 | Jung ............... H04N 21/4586 725/132 |
| 2016/0105530 | A1 | 4/2016 | Shribman et al. |
| 2017/0269927 | A1* | 9/2017 | Yuan ............... G06F 21/572 |
| 2019/0297383 | A1 | 9/2019 | Mendenhall et al. |
| 2020/0107073 | A1 | 4/2020 | Tandon et al. |
| 2020/0112768 | A1 | 4/2020 | Tandon et al. |
| 2022/0030326 | A1 | 1/2022 | Tandon et al. |
| 2022/0210509 | A1 | 6/2022 | Tandon et al. |
| 2023/0254539 | A1 | 8/2023 | Tandon et al. |

OTHER PUBLICATIONS

International Search Report and Written Opinion directed to related International Application No. PCT/US2019/023102, mailed on Jul. 4, 2019; 11 pages.

International Preliminary Report on Patentability directed to related International Application No. PCT/US2019/023102, mailed on Sep. 29, 2020; 9 pages.

* cited by examiner

COMPUTING DEVICE UPGRADING SYSTEM OVER A WIRELESS NETWORK

CROSS-REFERENCE TO RELATED APPLICATIONS

This application is a continuation of U.S. patent application Ser. No. 18/137,479 titled "Computing Device Upgrading System Over A Wireless Network", filed Apr. 21, 2023, which is a continuation of U.S. patent application Ser. No. 17/699,733 titled "Media Device Upgrading System Over A Wireless Network", filed Mar. 21, 2022, which is a continuation of U.S. patent application Ser. No. 16/700,600 titled "Network-Based Media Device Upgrading System", filed Dec. 2, 2019, which is a continuation-in-part of U.S. patent application Ser. No. 16/357,740 titled "Media Device Upgrading System", filed Mar. 19, 2019 which claims priority to U.S. Provisional Appl. No. 62/646,994 titled "Media Device Upgrading System," filed Mar. 23, 2018, and further claims priority to U.S. Provisional Appl. No. 62/900,919 titled "Network-Based Media Device Upgrading System," filed Sep. 16, 2019, all of which are herein incorporated by reference in their entireties.

TECHNICAL FIELD

This disclosure generally relates to the upgrading of media devices.

BACKGROUND

Smart televisions allow a user to access different applications that provide on-demand access to different types of content from different content providers. While these apps are often upgraded and changed, particularly to take advantage of new and ever advancing technologies, the hardware in old (previously purchased) televisions remains the same. With this divergence, it does not take much time for old TVs to lose the ability to effectively support and run new apps.

SUMMARY

Various embodiments are described throughout this specification. This disclosure is not limited to the summary provided herein.

An example embodiment may include a computer-implemented method. In an embodiment, it is determined that a computing device is configured to output content received by the computing device over a wireless network. It is determined that the computing device is connected to an upgrader device over the wireless network connection. It is determined that an upgrader mode of the computing device is activated based on the determination that the wireless network connection to the upgrader device is active. A command at is received at the computing device. It is determined that a speed of the wireless network connection exceeds a threshold. The command is transmitted to the upgrader device based on both the determination that the upgrader mode of the computing device is active and the determination that the speed of the wireless network connection exceeds the threshold. At the computing device, a response from the upgrader device executing the command is received, and content is output.

Another embodiment may include a computing device including at least processor configured to perform various operations. In an embodiment, it is determined that the computing device is configured to output content received by the computing device over a wireless network. It is determined that the computing device is connected to an upgrader device over the wireless network connection. It is determined that an upgrader mode of the computing device is activated based on the determination that the wireless network connection to the upgrader device is active. A command at is received at the computing device. It is determined that a speed of the wireless network connection exceeds a threshold. The command is transmitted to the upgrader device based on both the determination that the upgrader mode of the computing device is active and the determination that the speed of the wireless network connection exceeds the threshold. At the computing device, a response from the upgrader device executing the command is received, and content is output.

Another embodiment may include a non-transitory computer-readable device having instructions stored thereon. In an embodiment, it is determined that a computing device is configured to output content received by the computing device over a wireless network. It is determined that the computing device is connected to an upgrader device over the wireless network connection. It is determined that an upgrader mode of the computing device is activated based on the determination that the wireless network connection to the upgrader device is active. A command at is received at the computing device. It is determined that a speed of the wireless network connection exceeds a threshold. The command is transmitted to the upgrader device based on both the determination that the upgrader mode of the computing device is active and the determination that the speed of the wireless network connection exceeds the threshold. At the computing device, a response from the upgrader device executing the command is received, and content is output.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a databus-based media device upgrading system.

Figure 1A:
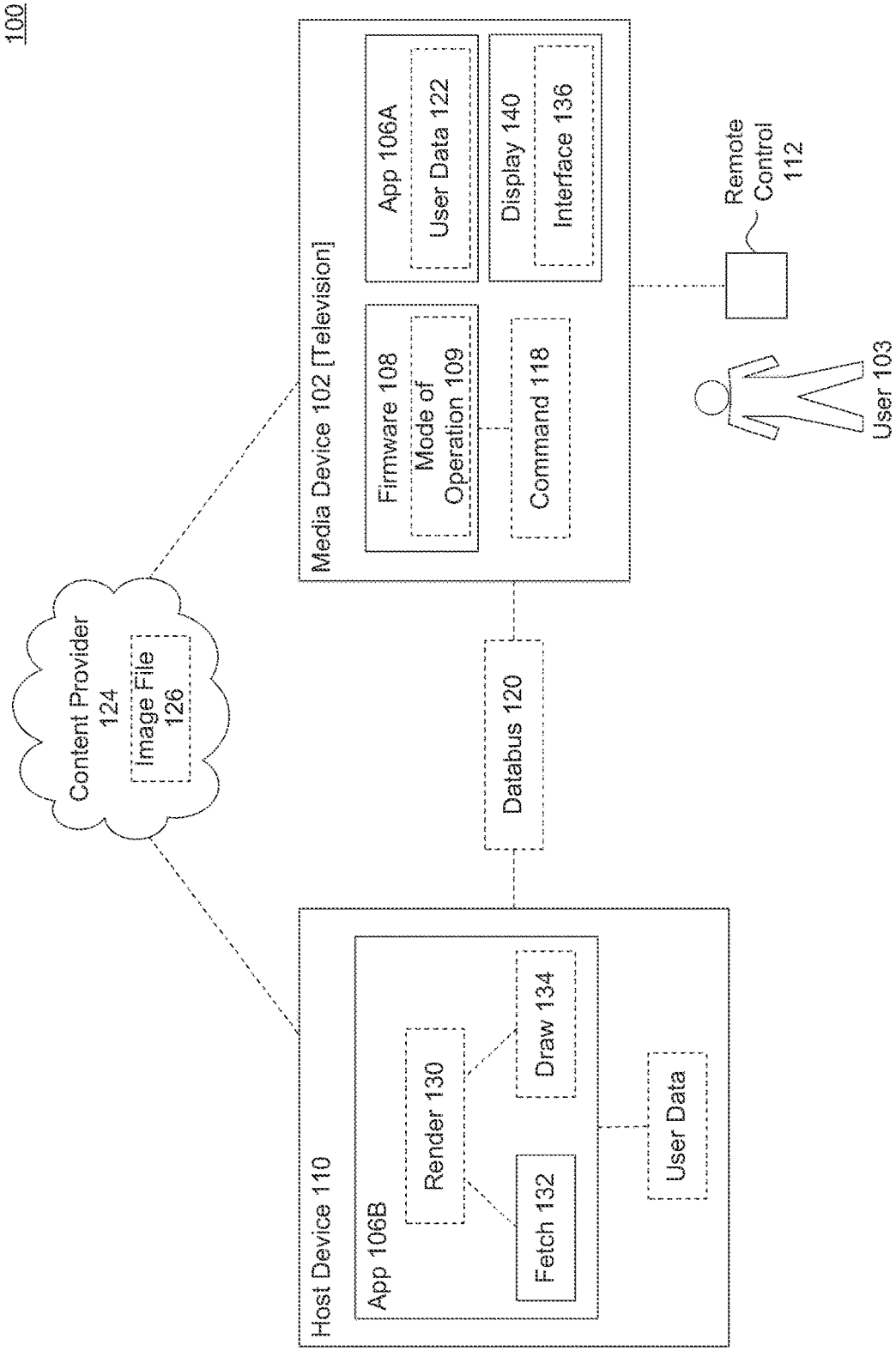
FIG. 1A is a block diagram illustrating a databus-based media device upgrading system, according to some embodiments.

FIG. 1A is a block diagram 100 illustrating a databus-based media device upgrading system, according to some embodiments. The system of FIG. 1A may be used to improve the processing speed and capabilities of a media device 102 (such as a television). For example, when a user buys a new television, the user may be able to operate all of the latest apps and games and receive high quality and fast access to the various functionalities of these apps (such as but not limited to streaming media applications).

However, as technology improves, these apps and new apps may be adapted and updated to take advantage of this improving technology. As such, at a certain point, the original hardware of the television may no longer be suitable for executing these new and adapted apps configured to take advantage of the capabilities of the newer equipment (e.g., the original television hardware may be too slow or incapable of executing all the functions these apps). As such, a user is often forced to buy a new television for a satisfactory or improved viewing experience. The system described herein may enable the television (e.g., media device 102) to be upgraded without having to trash and replace the old television and may effectively extend the useful life of media devices 102.

Media device 102 may be any device capable of receiving and outputting media in visual, audio, and/or other multimedia format. Example media devices include televisions (including smart televisions), streaming media players, laptops, desktops, mobile phones, radios, monitors, soundbars, voice responsive devices (such as voice responsive speakers, personal digital assistants, etc.), wearable computing devices, appliances, internet of things (IoT) devices, and/or other computing devices.

For purposes of illustration, and not limitation, media device 102 may sometimes be referred to herein as a television (which may include a smart television capable of receiving streaming or other network-based or cloud-based content), but it is understood that in other embodiments, other types of media devices may be used, including a streaming device connected to a television, monitor, gaming or media streaming console, and may include audio-only devices.

Media device 102 may include an app 106A that has been installed. Through app 106A, media device 102 may be capable of receiving and outputting streamed and/or packaged media in audio, video, and/or other multimedia formats. For example, app 106A may enable a user 103 to select and watch television shows, movies, or music videos on media device 102. Examples of commercially available apps 106A include but not are limited to NETFLIX, HULU, SLING, HBO GO, and YOUTUBE. In other embodiments, app 106A may include network-based and/or interactive video games which may be single-player or multi-player. Other examples of app 106A will be apparent to persons skilled in the relevant art(s). During the execution of app 106A, media device 102 may connect to a content provider 124 to receive one or more image files 126 which are received and output.

As noted above, while the primary example used throughout will be in terms of a television (media device 102) and a video streaming application (app 106), however it is understood that the processes described herein may be applied to other embodiments as well. For example, media device 102 may include another app, streaming, or gaming console such as APPLE TV, AMAZON ECHO, GOOGLE HOME, XBOX, NINTENDO SWITCH, PLAYSTATION, smartphone, appliance, Internet of Things (IoT) device, etc. And the app 102 may include audio, multimedia, or gaming applications, to name just some examples.

Content provider 124 may include one or more content servers that store and make available data (e.g., image files 126) to be output or displayed on media device 102 through app 106A. For example, when user 103 selects a movie to watch, app 106A may direct media device 102 to connect to one or more content servers (e.g., content provider 124) to retrieve image files 126 (which may include streaming media such as movies and/or still images such as logos, movie posters, text, audio files, etc.), gaming scenarios, etc. which are received and displayed or otherwise output on media device 102 through app 106A.

Media device 102 may be configured with firmware 108 and a device operating system which is configured to execute various applications, games, programs, or apps 106A and output media using the hardware components of media device 102. The various hardware components of media device may include one or more processors, memory (e.g., such as random access memory, buffers, cache, etc.), audio and video decoders, wireless communication modules (Wi-Fi, Bluetooth, infrared, motion detection, etc.), speakers, and resolution modules, and/or other components. Such hardware components are generally collectively indicated as hardware, and may include a display 140.

Generally speaking, at the time of manufacture, the hardware included in a given television or other media device 102 may be state-of-the-art and capable of supporting the newest apps 106. But, as technologies change and advance, the processing capabilities of new televisions and other devices similarly change and advance. Seeking to optimize the user experience, app developers may upgrade or change the operations and/or requirements of apps 106 to take advantage of new hardware and computer processing technologies. But, the hardware of previously manufactured televisions or gaming consoles remains the same. Over time, the changes to apps 106 that take advantage of new technology may cause a degradation of the user experience in older televisions (e.g., due to slow processor speeds, limited memory, and/or other inabilities to support the latest apps 106).

Eventually, some of the apps 106 may no longer be functional in older televisions, or the user experience may be degraded to such a point that a user or customer may be forced to take action to replace or upgrade the media device 102. Conventionally, the only possible actionable solutions were (1) for the user to refurbish his older TV with new hardware and software, a process that was time consuming, expensive, and technically challenging process; or (2) for the user to purchase a new television or media device altogether, which was often even more expensive than refurbishing.

However, rather than resorting to either of these unenviable, expensive, and environmentally wasteful options, the upgrader embodiments described herein may be used to upgrade a user experience with an existing older television or other devices by offloading some of the processing tasks required by applications, programs, games, or apps 106A to another host device 110.

Host device 110 may provide access to new hardware functionality capable of supporting the changes in apps 106 that are intended to take advantage of hardware capabilities beyond the hardware capabilities which were originally provided in media device 102. For example, host device 110 may provide more, enhanced, or faster processors, memory, etc. In a coordinated manner, host device 110 may extend the useful lifespan of media device 102 by supporting at least a partial execution of existing, new and upgraded apps 106 through dividing the labor of executing app 106 and leveraging the state-of-the-art or more available hardware capabilities of host device 110 working in combination with the original hardware capabilities of media device 102.

In various embodiments, host device 110 may be communicatively coupled to media device 102 over a databus 120. Databus 120 may include one or more communication channels that provide for bidirectional synchronous or asynchronous communication between host device 110 and media device 102. Example databuses 120, as will be described in greater detail below, include the Internet, a private network (such as home, local, or corporate network), and a universal serial bus (USB) or other physical connection.

Figure 1B:
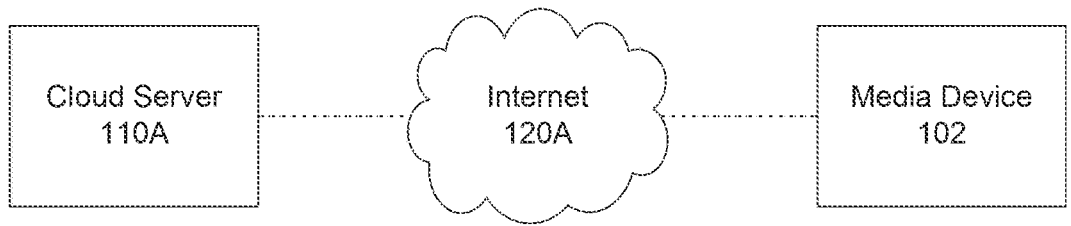
FIGS. 1B-1D illustrate example embodiments of the system providing for databus-based media device upgrading, according to some example embodiments.

FIG. 1B illustrates an example embodiment in which databus 120 is the Internet 120A, and host device 110 may include network or cloud servers 110A that communicate with media device 102 using the internet protocol (IP) or other Internet-compatible communication protocols. In an embodiment, the upgrader system as provided by cloud servers 110A may include free, paid, or subscription services.

Figure 1C:
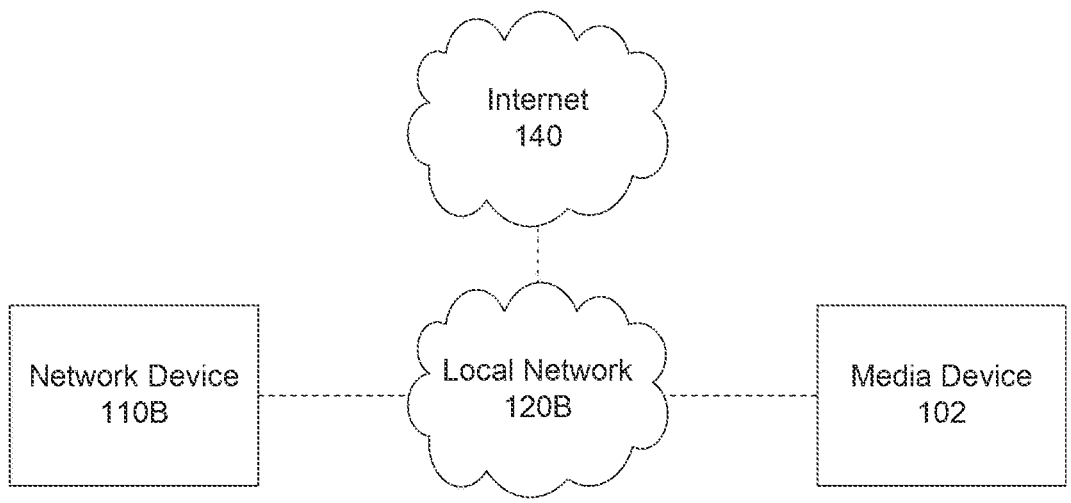

FIG. 1C illustrates an example embodiment in which databus 120 may be a local network 120B and host device 110 may include a network device 110B that is configured to connect to and communicate with media device 102 over the home or private network 120B. Example network devices 110B include a range extender or other standalone upgrader or device that communicates with media device 102 over a corporate, home, private, or local network 120B to which both devices 102, 110B are connected. In another embodiment, network device 110B may communicate with media device 102 over Bluetooth, infrared, or other communication channels which may operate as the databus 120.

Figure 1D:
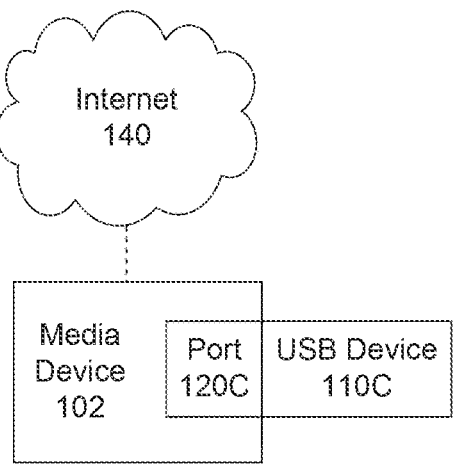

FIG. 1D illustrates an example embodiment in which databus 120 may be a hardwired or physical connection, such as a universal serial bus (USB) available through a port 120C. Host device 110 may be a USB device 110C such as a thumb drive or media or streaming stick, or other device that is configured to be coupled with or connected into a USB, HDMI (high definition multimedia interface), or other port 120C of media device 102. In an embodiment, removing networking features from network device 110B. may make it possible for a smaller and/or less expensive USB device 110C.

Returning to FIG. 1A, the cloud service embodiment of host device 110 communicating with media device 102 over the Internet (e.g., operating as a databus 120) will be used as the primary context herein. However, it is understood that many of the features applicable to the cloud service host device 110 are also applicable to the network device and USB device embodiments. Any distinctions particular to the various embodiments are described herein.

In an embodiment, media device 102 may include different modes of operation 109. In a first mode of operation 109, referred to as a "normal mode," media device 102 may operate without using or interacting with host device 110. In a second mode of operation 109, referred to as an "upgrader mode," media device 102 may operate in coordination with host device 110 as described herein over one or more databuses 120.

During the normal mode of operation, media device 102 may be disconnected from host device 110 or databus 120 may be unavailable. During normal mode of operation, app 106A may be executed using the installed or original hardware of media device 102, and commands 118 may be received and processed locally by firmware 108 and transferred directly to app 106A.

When in upgrader mode, host device 110 may provide for a seamless integration with media device 102 over databus 120. In this upgrader mode, the "look and feel" of the user experience may remain relatively or exactly the same, except that processing time may be improved and delays may be reduced in the execution of app 106A and the output of media through media device 102. Accordingly, from an end user 103 point-of-view, the functionality of media device 102 may appear to be the same, even while the responsiveness and capabilities may be improved through leveraging the more powerful and expanded hardware capabilities of the host device 110 through databus 120.

In an embodiment, host device 110 and media device 102 may respond to user commands 118 received using a remote control 112 associated with media device 102. For example, the remote control 112 may be the same original remote control that came with television or media device 102 (which may be connected to a television) when it was manufactured. Remote control 112 may be used to both control the operation of the television hardware (such as power, volume, display settings, input selection, etc.) and the device OS functionality (such as menu selections, downloading and launching applications 106, operating the apps 106, etc.). In other embodiments, remote control 112 may be joystick, controller, laptop, voice-activated microphone, or mobile phone that has been communicatively coupled with media device 102.

In an embodiment, firmware 108 may receive commands 118 from remote control 112, and determine whether to direct command 118 to the hardware of media device 102, app 106A, host device 110, or content provider 124.

During upgrader mode, a portion of operations of app 106 are performed by remotely executing versions of app 106A on one more host devices 110. These operations may include application-related or input commands 118 received from remote control 112. In an embodiment, firmware 108 may check to determine whether databus 120 and host device 110 are available to determine whether or not to operate in upgrader mode. This mode check may occur when media device 102 is powered on or booted up, upon the activation or instantiation of a local execution of app 106A, periodically, or upon receiving one or more commands 118 from remote control 112.

In an embodiment, firmware 108 may periodically check the connection status with host device 110, and if the connection is lost or regained, firmware 108 may toggle back and forth between normal mode and upgrader mode seamlessly (e.g., without notifying the user interrupting a user's experience). In another embodiment, firmware 108 may check the speed or available bandwidth of databus 120 and if it falls below a threshold, firmware 108 may enter media device 102 into normal mode. In an embodiment, a visual or audio notification of the mode of operation 109 may be provided to the user, even as the connection to host device 110 may be gained and/or lost.

Unlike some prior approaches, the user 103 is not required to manage two devices independently, and may not even be aware of which mode of operation 109 is be executed on media device 102 in the execution of one or more apps 106. Host device 110 operates seamlessly with the media device 102 using a single remote control 112 and the media device 102's original user interface, to provide a seamless upgrade to various aspects of the media device 102 which enables the two devices to act as one unified device. User 103 may continue operating the same media device 102 with the same remote control 112 regardless of the mode of operation 109.

In an embodiment, when a command 118 is received from remote control 112, firmware 108 may determine whether the command 118 is one to be handled by the media device 102's original hardware, app 106A, or whether to provide or transmit command 118 to host device 110 to be handled by the host device 110's hardware and processing capabilities based on the mode of operation 109.

In an embodiment, there may be a set of commands 118 particular to the operation of media device 102 that are always handled locally by the local or original hardware of media device 102 independent of the mode of operation 109. These commands 118 may include, hardware command such as power on/off commands, volume adjustment commands, visual adjustment commands (e.g., brightness, tint, color, hue, etc.).

Other application commands or app or software directed commands, such as selections to launch app 106A, exit app 106A, select or browse movies and other multimedia to consume, adjust settings, logging in, navigation, switching users, moving a player, fast-forward, rewind, etc. may be handled by firmware 108 and may be directed to app 106A and/or host device 110 for processing in upgrader mode.

As illustrated in FIG. 1A, host device 110 may be executing app 106B. App 106B may be a new instance or mirror of the same version of app 106A executing on media device 102. In an embodiment, app 106B may be configured to be a mirror or clone executing the operations of the application 106 responsive to user commands 118 received from remote control 112 locally on host device 110.

For example, when an application command 118 is detected at media device 102. Firmware 108 may transmit the command 118 to host device 110 over databus 120. Host device 110 may provide the command 118 to app 106B. Host device 110 may then intercept, capture, or record the response of app 106B and provide the response (e.g., render 130, fetch 132, or draw 134) to media device 102 which is then executed.

In an embodiment, the command 118 may be a launch command 118 in which user 103 selects app 106 from an interface of media device 102. Upon receiving launch command 118, firmware 108 may simultaneously activate or launch app 106A locally on media device 102 and provide or make available the launch command 118 and/or user data 122 to host device 110 over databus 120. In an embodiment, launch command may be processed locally on media device 102.

User data 122 may include any locally stored information (on media device 102) about one or more user accounts associated with app 106A. In an embodiment, user data 122 may include usernames, passwords, version umbers, age, restrictions, color schemes, preferred settings, usage and login history, an identification of which user 103 is logged into or using media device 102, or other user information. In an embodiment, user data 122 may be provided to host device 110 over databus 120 in addition to or in lieu of a launch command 118, and may be interpreted as signaling a launch command 118.

Upon receiving launch command 118, host device 110 may identify and instantiate a new instance of the same app 106 as app 106B with same version number and login or user information, usage history, and other data as indicated by user data 122. As referenced above, host device 110 may include a cloud networking system (110A) with multiple servers which may be configured to simultaneously execute different versions of app 106A across one or more different media devices 102 and/or user accounts that are geographically distributed.

For example, host device 110 may be executing both version 1 of app 106 for a first user operating a first television, and version 2 of app 106 (or another instantiation of version 1) for a second user operating a second television.

In an embodiment, upon a successful launch and configuration of app 106B on host device 110, host device 110 may communicate an acknowledgement or successful connection signal which may cause firmware 108 to enter upgrader mode. In an embodiment, the acknowledgement signal an IP address of the host device which is handling commands 118. Host device 110 may provide a render command 130 indicate what media or images are to be output by media device 102.

In the absence of an acknowledgement signal, or upon the receipt of a failure signal, firmware may periodically send one or more launch commands 118 until an ack signal is received or a time or retry threshold is reached and the host device 110 is deemed unavailable. Until a successful connection acknowledgement is received or connection is confirmed with host device 110, media device 102 may continue operating in normal operational mode.

In an embodiment, if upgrader mode has already been entered for one app 106 on media device 106, then upgrader mode may continue for a second app 106 which is activated on media device 102. In an embodiment, the second app may not be available or supported in upgrader mode (e.g., by a host device 110) and media device 102 may have one app 106 executing in upgrader mode, and a second unsupported app executing in normal mode. In an embodiment, a first host device 110 may be providing upgrader functionality for a first app 106A on media device 102, while a second host device 110 is providing upgrader functionality for a second app 106A on media device 102 over the same or different databuses 120.

In an embodiment, upon a successful configuration and launch of app 106B, app 106B may issue one or more render commands 130. Render command 130 may be any command issued by an app 106 that indicates what is to be executed, retrieved, rendered, or otherwise output by media device 102 on an interface 136 of a display 140 for app 106.

For example, render command 130 may indicate which images, text, video, audio, etc. are to be output and/or the orientation of any of these features. In an embodiment, render command 130 may include a location or screen area on interface 136 where to render the command on media device 102.

In an embodiment, user data 122 may include an indication as to on which media device 102 app 106A is executing (e.g., type of device, model number, manufacturer, year of manufacture or release, firmware version, operating system version, processing capacity, memory, etc.). For example, the dimensions of a display 140 may impact which render commands 130 are provided responsive to commands 118 by app 106B. These render commands 130 may be received over databus 120 and executed by media device 102 to draw or display interface 136 of app 106A.

In an embodiment, the render command 130 may include fetch commands 132 and draw commands 134. Fetch commands 132 may indicate which file or media is to be retrieved from content provider 124 or a local memory for rendering an interface 136 of app 106A. Rather than executing a fetch command 132 locally on host device 110 and then transferring the fetched file to media device 102 over databus 120 (which would consume additional processing resources, memory and bandwidth), host device 110 may simply transmit fetch command 132 to media device 102.

Media device 102 may then execute the fetch command 132 to retrieve the file into local storage or memory. Executing the fetch command 132 may include contacting one or more servers across one or more different content providers 124 to retrieve audio and/or image files 126 (which may include static image or sound files, or streamed media).

Or, for example, fetch command 132 may indicate a locally stored file on media device 102 to be fetched, retrieved, or otherwise used. For example, when app 106A is installed or instantiated on media device 102, app 106A may store a set of files that are commonly used locally in the memory of whatever device 102 on which app 106A has been installed or is executing. Fetch 132 may refer to fetching one or more of these locally stored or accessible files. Fetch 132 may include a network or local address or description of which file is to be retrieved or fetched.

Upon detecting that the identified file(s) have been fetched, retrieved, or otherwise made available (e.g. in the random access or disk-based memory of media device 102), firmware 108 may transmit an acknowledgement message to host device 110 (indicating that the files were or were not successfully retrieved or fetched). This acknowledgement message may include metadata corresponding to the fetched file. The metadata may include a file name, size, location, file type, etc. The acknowledgement (and metadata) message may be transferred to host device 110 over one or more channels of databus 120.

In an embodiment, if host device 110 does not receive a fetch acknowledgment message within a threshold period of time, the same render 130, fetch 132, or draw 134 command may be re-sent or re-transmit over databus 120 until a threshold number of times has been reached or an acknowledge is received.

If a threshold number of transmits or time threshold has been reached and no acknowledgement has been received, in an embodiment, host device 110 may interpret this as a media device 102 crash and quit or exit app 106B or move app 106B to a background process to save or free up local host 110 resources. These host resources may then be made available to other processes, including supporting other media devices (in a cloud computing or network computing embodiment). For example, host device 110 if communicating over the same local network (e.g., databus 120) as media device 102, may support the processing of multiple locally connected televisions, gaming consoles, media devices 102.

In an embodiment, render commands 134 may include draw commands 134. Draw commands 134 may indicate where particular lines, shapes, text, and in which colors are to be displayed on interface 136. In an embodiment, a render command 130 may include draw commands 134, fetch commands 132, and/or other processing or output commands. In an embodiment, a render command 130 may include the coordinates and/or relative locations of the various objects to be displayed on interface 136.

Firmware 108 may receive the render commands 130, including fetch commands 132 and/or draw commands 134, and execute the render commands locally at media device 102 and generate or draw interface 136 on display 140 of media device 102. Upon successful execution, media device 102 may transmit an acknowledgment message to host device 110. In other embodiments, the acknowledgment may not be transmit. This process of generating and capturing or intercepting the render commands 130 on host device 110 and then transferring the render commands 130 over databus 120 to media device 102 may result in significant processing and resource utilization savings for media device 102, including faster rendering, fewer delays and an improved user experience.

For example, media device 102 (when in upgrader mode) may no longer use its own resources to generate its own render 130, fetch 132, and/or draw 134 commands using local processing capabilities of media device 102 (which may be slower than using host device 110 hardware and receiving the render commands 130 over databus 120).

Instead, host device 110 uses its improved or more available processing resources to mirror or clone version of app 106B similar to app 106A as it is being executed locally on media device 102, to generate commands render 130, fetch 132, and draw 134. Then, for example, media device 102 may simply execute the received commands (e.g., similar to a monitor). This upgrader mode may effectively extend the useful life of media device 102, save consumers or user 103 money, and prevent landfills from being filled up with discarded media devices 102.

In an embodiment, in upgrader mode, firmware 108 may provide commands 118 to both app 106A and host device 110 (to be executed by app 106B). Then, for example, firmware 108 may execute the first response received from either host device 110 (from app 106B) or app 106A. Any duplicate or later command may then be discarded or ignored. In this manner, app 106A and app 106B may be coordinated, such that if there is an issue with databus 120 or other connection to host device 110, the user experience may continue without being interrupted.

As noted above, FIGS. 1B-1D illustrate three example embodiments of the system described above with respect to FIG. 1A, according to some example embodiments. FIG. 1B illustrates a cloud-configured service embodiment, in which host device 110 is one or more servers 110A (that may or may not be arranged into a cloud configuration) with which media device 102 communicates over the Internet 120A. Internet 120A may be used as the one or more communication channels of databus 120.

In the cloud-based embodiment, an upgrader service provider may identify a subset of media devices using a particular operating system that are accessing or that have downloaded a particular app 106. The app 106 may be particular targeted for upgrading (e.g., because it relies on technological advancements beyond what is capable on media device 102). In this manner, cloud servers 110A may be configured to provide upgrader services for some apps 106 and/or devices 102, and not others.

In an embodiment, an upgrader service provider may identify a particular manufacturer name, model number, and/or manufacturing year of media device 102 for which to provide upgrader services. For example, SAMSUNG televisions, model 5, with a ROKU operating system may be selected for upgrade. It may be determined that the hardware of is model of television or device is no longer compatible or with takes too long (e.g., beyond a threshold) to perform one or more functions of app 106.

In another embodiment, cloud server 110A may be available to a wide range of different devices, or any device with a particular operating system or a particular app 106. In an embodiment, cloud server 110A may identify the hardware associated with a particular media device 102, and may perform a subset of functions known to be slow processing or which the original or identified hardware of a particular media device 102 may not be able to handle. For example, a newer media device 102 may be able to process its own draw commands 134, but fetch commands 312 may be still be received from a cloud server 110A, while an older media device 102 may be upgraded by receiving both draw and fetch commands 132, 134 from cloud server 110A. Over time, as apps 106A and technology changes, the same device 102 may have more processing offloaded or performed by cloud server 110A. Additionally, new devices 102 and/or apps 106 may be added and supported by the cloud servers (as host 110).

One or more cloud servers 110A may be configured as host devices 110 for identified media devices 102 meeting the specified qualifications. In an embodiment, these identified televisions (e.g., media devices 102) may be provided a firmware 108 upgrade. For example, based on their opting into or paid subscription for upgrader services, user 103 may be requested to authorize a firmware upgrade to enable different modes of operation 109, including a new upgrader mode.

The firmware upgrade may cause firmware 108, instead of processing all commands 118 locally at media device 102, to begin transferring a subset of commands 118 to host device 110 when in upgrader mode, as described herein. This firmware-based upgrade may enable the upgrader mode to be applied to legacy media devices 102 that were already manufactured and in operational use prior to the development or availability of an upgrader mode or an upgrader service, including the services and devices described in FIGS. 1C and 1D below. Further, this firmware upgrade may be applied to legacy applications 106 without requiring a developer of the applications to change how the applications receive or process commands 118, or stream media (e.g., image file 126).

In another embodiment, the mode of operation 109 functionality may already be present within firmware 108 or an operating system of media device 102. In another embodiment, the upgrade may be integrated within app 106A rather than firmware 108.

FIG. 1C illustrates a network device embodiment, in which host device 110 is a local network-configured device 110B with which media device 102 communicates over the local network 120B. While local network 120B may be used as the one or more communication channels of databus 120, network device 110B and/or media device 102 may still access the Internet 140 (and content providers 124) through local network 120B or separate cellular or network connections.

Local network 120B may be a university, corporate, home, or other private or public network which supports multiple devices to connect and communicate with one another and/or access the Internet 140. In an embodiment, network device 110B may include its own Wi-Fi or other networking capabilities to request or receive streaming content or apps 106 from an app store or content provider 124, and communicate with media device 102.

In an embodiment, a user 103 may plug in and configure host device 110 (as a local network device) to communicate with media device 102 over the same local, private, or public network. In an embodiment, network device 110B may broadcast or advertise its capabilities (e.g., for upgrading) to one or more devices over a wireless network (e.g., using the network device 110B's Wi-Fi or networking capabilities). For example, network device 110B may use simple service discovery protocol (SSDP) which may enable discovery and communication between network device 110B and media device 102.

In an embodiment, while using a network device 110B may require a user 103 to configure a new device 110B onto their local network 120B, the network device 110B may also potentially reduce a latency between media device 102 and host device 110 relative to a cloud or other Internet-communications based host device 110A. For example, wireless communications between devices may be faster between the devices are located same room or operating on the same network relative to two devices that are located hundreds or thousands miles apart (which may be the case in a cloud services embodiment). Also, communications over local network 120B may not be subject to outages and network delays in the same way that Internet 120A communications may be.

As referenced above, FIG. 1D illustrates an embodiment, in which host device 110 is embodied in a USB device 110C with which media device 102 communicates over an input port 120C. In an embodiment, input port 120C may be a USB port on media device 102, and USB device 110C may be stick or other small plugin device that connects directly to media device 102 and communicates over the databus 120 of USB.

In an embodiment, a user may insert upgrader device 110 into a particular one of the ports 120, such as port 120C for example purposes (which may be an HDMI port, for example), and then send a command 118 to switch the input of media device 102 to port 120C, to thereby enable the plug-and-play capabilities and interactions between upgrader device 110 and media device 102.

Media device 102 may have Internet access 140 through cellular or local network connections. In an embodiment, USB device 110C may leverage some of the original hardware of media device 102 to provide a user with the perception and "look and feel" as if the app 106A is operating fully on media device 102 and to save network bandwidth and other processing resources.

In another embodiment, USB device 110C may utilize or leverage the Wi-Fi or networking capabilities in the original hardware of media device 102 to download apps 106, which may then be displayed through media device 102 as described herein. USB device 110C may also derive its power through the capabilities of USB.

In an embodiment, to operate with the media device 102, USB device 110C may first need to be recognized by media device 102. For example, USB device 110C may be physically inserted into one of the ports 120C. Port 120C may include a high-definition multimedia interface (HDMI) port, universal serial bus (USB) port, and/or any other port used by computing devices.

In another embodiment, handshaking and/or discovery between upgrader device 110 and media device 102 may be performed after or upon insertion of upgrader device 110 into port 120C. In an embodiment, USB device 110C may not have networking or Wi-Fi capabilities, and may instead communication with media device 102 via a USB port (rather than using an HDMI port). Through the USB port, USB device 110C may be able to receive power from media device 102 and/or have access to the networking capabilities of media device 102 (through which USB device 110B can request or control what content or apps 106 are downloaded or streamed to the media device 102).

Returning to FIG. 1A, in an embodiment, upon an initial synchronization between media device 102 and host device 110 (110A, 110B, and/or 110C), user 103 may be visually prompted to confirm that the user wants to enter upgrader mode 109 and perform the synchronization or handshaking process between host device 110 and media device 102. For example, the user may be asked if they want to upgrade media device 102 using an upgrader or host device 110. If the user says 'no', then firmware 108 may continue normal operations. However, if the user says 'yes', then the synchronization process may continue to enable a seamless connection and operation of the host device 110 with the media device 102.

During synchronization or as a result thereof, bi-directional communication between host device 110 and media device 102 may be enabled. During the synchronization process, host device 110 may obtain information regarding the media device 102 in order to at least emulate and interact with the media device 102. Thus, for example, the host device 110 may read or import configuration information, account information for a cloud account and/or for accessing content providers (such as HBO, NETFLIX, HULU, etc.), settings, preferences, history, graphical assets (so as to match, operate with, augment, enhance, emulate, etc., the TV 102's UI), WiFi credentials, and other user information from media device 102, which may be stored as user data 122.

For example, if media device 102 is a television, host device 110 may copy or import an electronic program guide, port names, account information for apps 106, preferences, viewing history, and other information which may have been stored and/or used by device 102. In an embodiment, this user data 122 information may be accessible via a flash or other memory of media device 102 (assuming the media device 102 previously exported and/or saved the information to such flash or other memory), and may be accessed and retrieved using NFS (network file system) or some other well-known protocol. In some embodiments, the flash or other memory may be secured so access is limited to the host device 110 and/or other authorized devices. Then, for example, during upgrader mode 109, host device 110 may use the television 102 as a monitor and speaker system for playing back content, while the media device 102 itself provides the media streaming functionality.

From an end-user point-of-view, the operations and functionality of media device 102 may appear the same, regardless of whether a command 118 is being handled or processed by media device 102 (normal mode) versus host device 110 and then media device 102 (upgrader mode). For example, the menu and other UI interactions may appear the same regardless of which mode of operation 109 is active. In another embodiment, media device 102 may include a visual or other indicator that differentiates between normal mode and upgrader mode. For example, the color of a menu may change, or the display may indicate that upgrader mode is active.

The processing by firmware 108 may be the same amongst the various embodiments of host device 110 and databus 120 (e.g., cloud server-internet, local device-local network, or plugin device-USB) to how commands 118 are handled. Commands 118 may include hardware commands and/or operational or software commands. In some embodiments, hardware commands are those that involve device-specific interactions with hardware features of the media device 102, such as a request to adjust the input or output settings of media device 102. Regardless of the mode of operation 109, hardware commands may be handled locally by firmware 108 without a message being sent to host device 110.

Other example hardware commands may include requests to adjust the volume, adjust display settings (e.g., tint, hue, brightness, color), adjust audio controls (e.g., bass, treble, balance), and switch active input ports. For example, a command 118 to make the active input port so that a user may play a video game on game console (or watch a DVD) may be handled by firmware 108 and/or media device 102 without any message sent to host device 110.

In some embodiments, operational or software commands may include requests to browse, purchase, download, launch, or otherwise interact with content or apps 106. For example, a user may want to download a new application 106, download content from content provider 124, or pause or rewind content via an active application 106, to name just some examples. In an embodiment, during normal mode, these commands may be handled or processed by media device 102, while during upgrader mode these commands may be handled or processed by host device 110 (for app 106B) in addition to media device 102 (app 106A).

In an embodiment, when a user issues a command 118, the user may be unaware of whether the command 118 is being handled by firmware 108, media device 102, host device 110, or some combination of devices. For example, the commands accessible via remote control 112, as well as operation of the remote control 112, may remain the same during both normal mode and upgrader mode 109. In an embodiment, remote control 112 may include soft or programmable keys, and may include new or additional functionality that may be available only during upgrader mode 109 when commands 118. For example, app 106 may include features that are only accessible using the new or upgraded hardware of host device 110.

Figure 2:
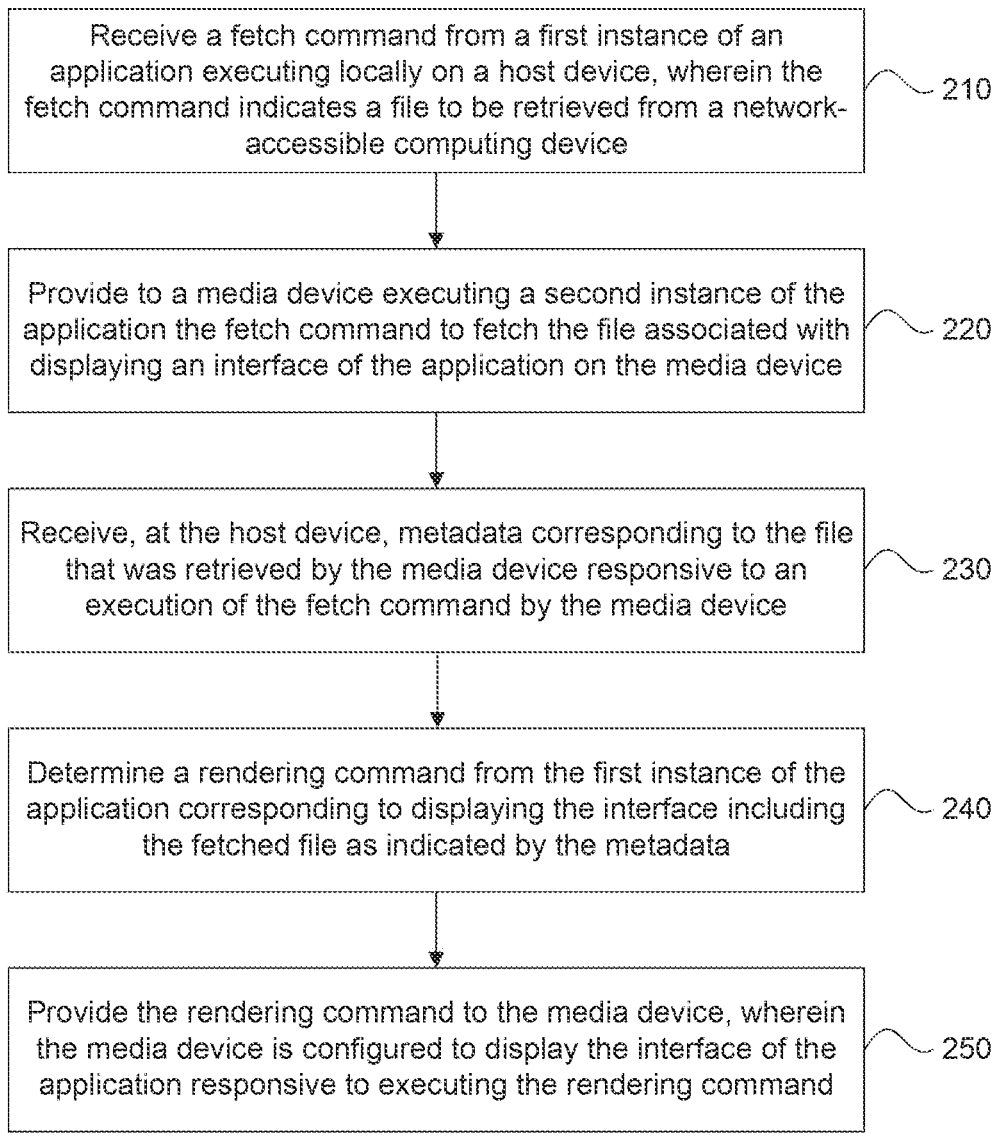
FIG. 2 is a flowchart illustrating example operations of a network-based media device upgrading system, according to some embodiments.

FIG. 2 a flowchart 200 illustrating example operations of a network-based media device upgrading system, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1A. However, method 200 is not limited to that example embodiment.

In 210, a fetch command is received from a first instance of an application executing locally on a host device. For example, media device 102 may be operating in an upgrader mode (109). Firmware 108 may receive a command 118 from remote control 112 as being operated by a user 103. Command 118 may be provided to app 106A and host device 110A for processing. Host device 110 may provide command 118 to app 106B for processing. App 106B may process command 118 using the hardware of host device 110 and may generate a render command 130, which may include a fetch 132 and/or draw command 134. Host device 110 may receive the fetch 132 command from app 106B.

In 220, the fetch command is provided to a media device executing a second instance of the application to fetch the file associated with displaying an interface of the application on the media device. For example, fetch 132 received by host device 110 may indicate a network address of an image file 126 to be retrieved for display in interface 136. Host device 110 may provide this fetch 132 command to media device 102 which may then fetch the image file 126. In another embodiment, the fetched filed may be stored locally on media device 102.

In 230, metadata corresponding to the file that was retrieved by the media device responsive to an execution of the fetch command by the media device is received at a host device. For example, the metadata of the file may include the file name, the location, size, type and/or an acknowledgment message that the file was retrieved. Firmware 108 may provide this metadata to app 106A and/or host device 110. Host device 110 may receive this metadata bout image file 126.

In 240, a rendering command is determined from the first instance of the application corresponding to displaying the interface including the fetched file as indicated by the metadata. For example, the metadata may be provided to app 106B which may generate a draw 134 command or render 130 command that indicates where to place or how to draw the interface 136 of app 106 using the fetched image file 126. The render 130 command may include coordinates, dimensions, shapes, colors, and other visual attributes necessary to render interface 136 on display 140 of media device 102.

In 250, the rendering command is provided to the media device. For example, host device 110 may transfer the render 130 command to media device 102. Media device 102 may then execute the render command 130 and the fetched file 126 (which may be stored in a local memory of media device 102) to display interface 136 on a screen or display of media device 102.

Figure 3:
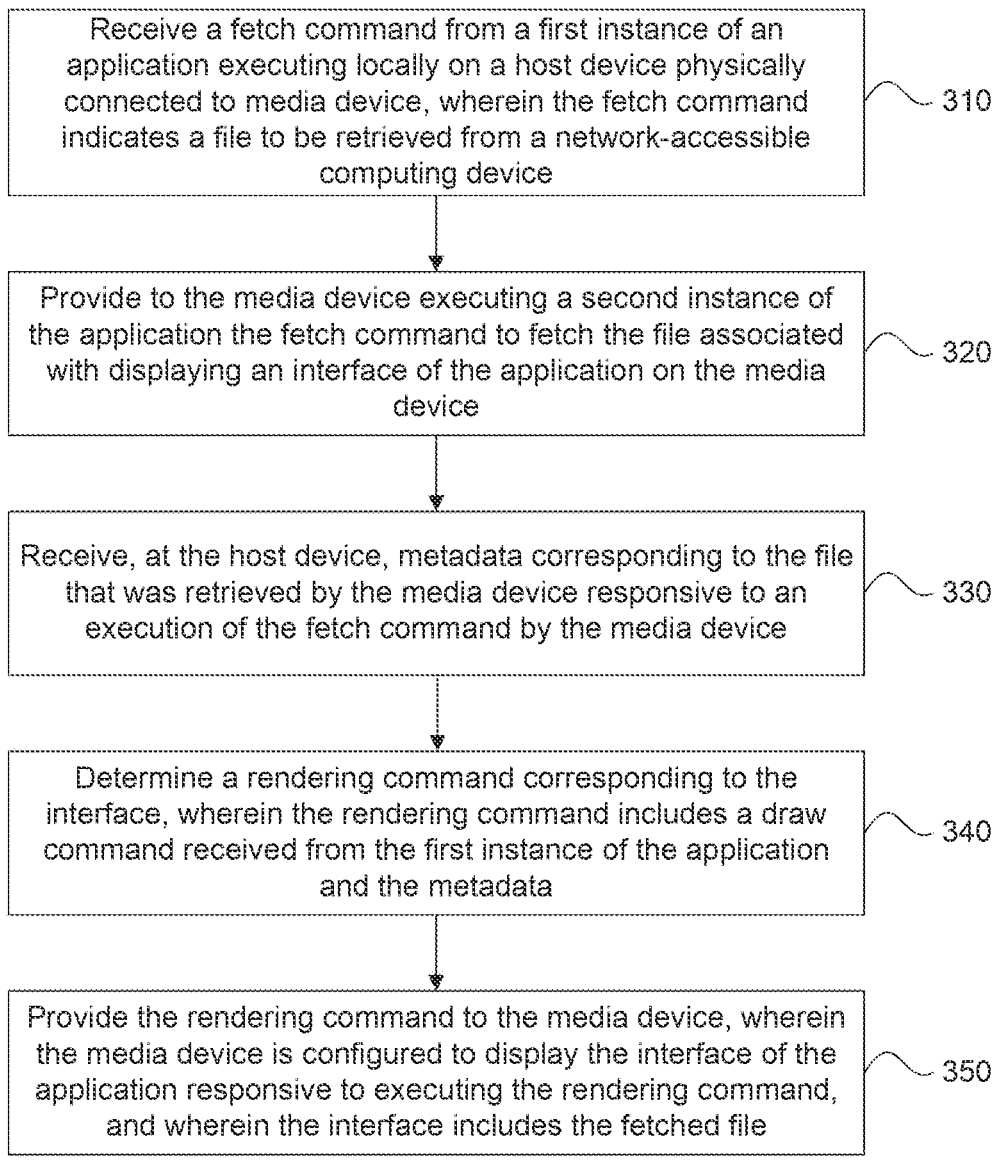
FIG. 3 is a flowchart illustrating example operations of a USB-based media device upgrading system, according to some embodiments.

FIG. 3 a flowchart 300 illustrating example operations of a USB-based media device upgrading system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1A and 1D. However, method 300 is not limited to that example embodiment.

In 310, a fetch command is received from a first instance of an application executing locally on a host device physically connected to media device, wherein the fetch command indicates a file to be retrieved from a network-accessible computing device. For example, as illustrated in FIG. 1D, USB device 110C may be connected to an input port 120C of media device 102. And USB device 110C may have an app 106B operating locally from which a fetch 132 command is received (e.g., responsive to a command 118) received from media device 102.

In 320, the fetch command is provided to the media device executing a second instance of the application to fetch the file associated with displaying an interface of the application on the media device. For example, the fetch 132 command is provided from USB device 110C to media device 102, which executes the fetch command 132. Execution of the fetch 132 command may include retrieving streaming media or an image file 126 from content providers 124 or another network or Internet-accessible location.

In 330, metadata corresponding to the file that was retrieved by the media device responsive to an execution of the fetch command by the media device is received at the host device. For example, upon receiving the stream of media or image file 126, media device 102 may read and provide metadata from image file 126 to host device 110 (e.g., USB device 110C).

In 340, a rendering command corresponding to the interface, wherein the rendering command includes a draw command received from the first instance of the application and the metadata. For example, USB device 110C may capture or receive a render 130 command on how to draw 134 interface 136 in display 140 of media device, using or positioning the retrieved or fetched file 126 or stream of media.

In 350, the rendering command is provided to the media device, wherein the media device is configured to display the interface of the application responsive to executing the rendering command, and wherein the interface includes the fetched file. For example, USB device 110C may provide render 130 to media device 102 over the USB port 120C, and media device 102 may render interface 136 responsive to command 118.

Figure 4:
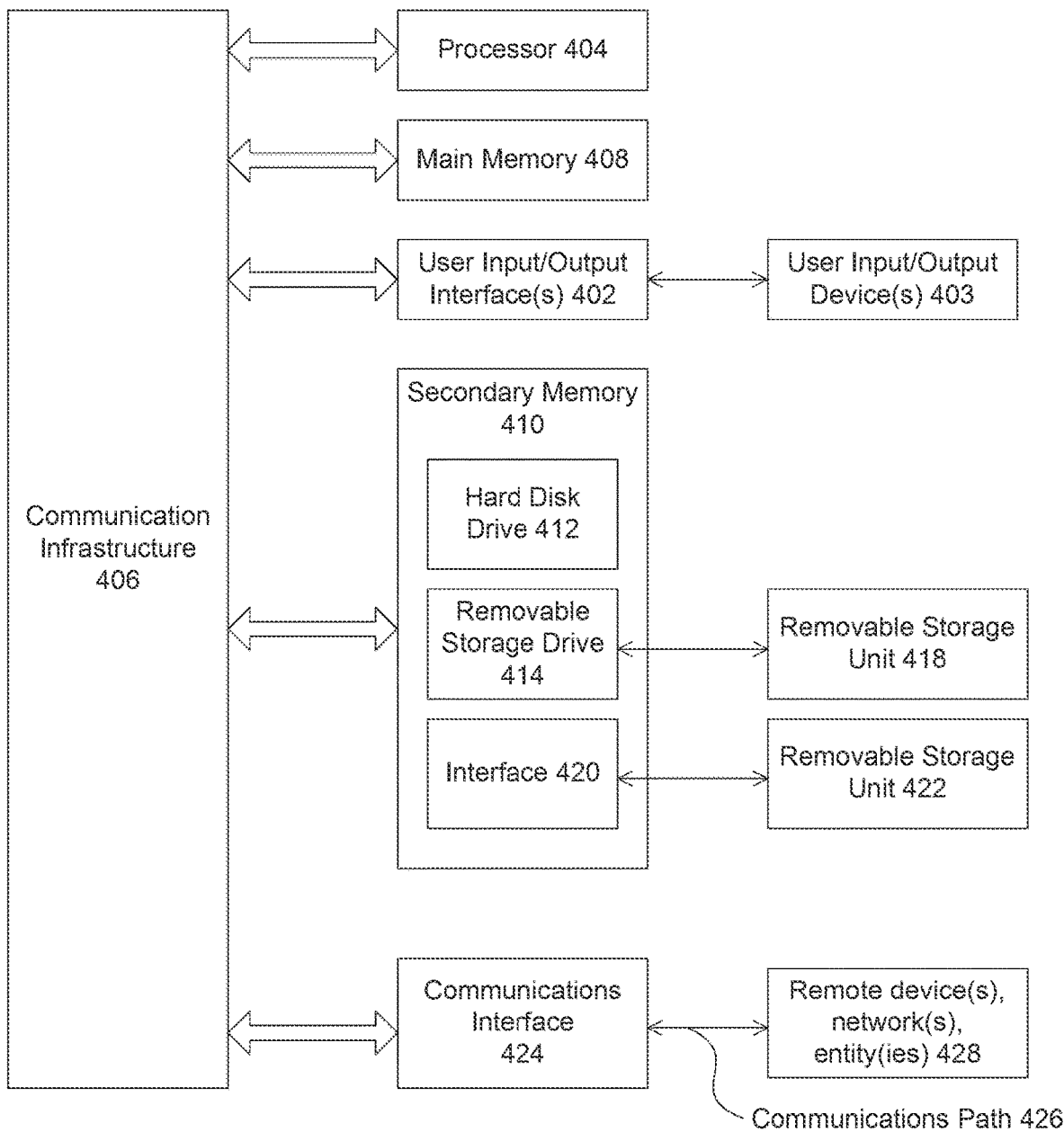
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   determining, by at least one computer processor, that a computing device is connected to an upgrader device over a wireless network connection, wherein the upgrader device includes hardware capabilities for processing content beyond capabilities of the computing device, and wherein during an upgrader mode of the computing device, at least a portion of a functionality of the computing device is executed by the upgrader device;
   receiving a command at the computing device;
   determining that a speed of the wireless network connection exceeds a threshold;
   transmitting the command to the upgrader device based on both the determination that the upgrader mode is active and the determination that the speed of the wireless network connection exceeds the threshold;
   receiving, at the computing device, a response from the upgrader device executing the command; and executing the received response at the computing device, wherein the received response directs the computing device to output at least a portion of the content.

2. The computer-implemented method of claim 1, wherein the content comprises streaming video game content.

3. The computer-implemented method of claim 1, wherein the content comprises only audio content.

4. The computer-implemented method of claim 1, wherein the upgrader device includes additional or faster memory relative to the computing device.

5. The computer-implemented method of claim 1, further comprising:
evaluating the command to determine whether to execute the command locally at the computing device or to provide the command for execution at the upgrader device.

6. The computer-implemented method of claim 1, further comprising:
receiving a second command;
determining that the speed of the wireless network connection is less than the threshold; and
executing the second command at the computing device based on the determination that the speed of the wireless network connection is less than the threshold.

7. The computer-implemented method of claim 6, further comprising:
providing a visual notification that the computing device is operating in a normal mode of operation based on the determination that the speed of the wireless network connection is less than the threshold.

8. A system, comprising:
one or more memories;
at least one processor each coupled to at least one of the memories and configured to perform operations comprising:
determining that the system is connected to an upgrader device over a wireless network connection, wherein the upgrader device includes hardware capabilities for processing content beyond capabilities of the system, and wherein during an upgrader mode of the system, at least a portion of a functionality of the system is executed by the upgrader device;
receiving a command at the system;
determining that a speed of the wireless network connection exceeds a threshold;
transmitting the command to the upgrader device based on both the determination that the upgrader mode is active and the determination that the speed of the wireless network connection exceeds the threshold;
receiving, at the system, a response from the upgrader device executing the command; and
executing the received response at the system, wherein the received response directs the system to output at least a portion of the content.

9. The system of claim 8, wherein the content comprises streaming video game content.

10. The system of claim 8, wherein the content comprises only audio content.

11. The system of claim 8, wherein the upgrader device includes additional or faster memory relative to the system.

12. The system of claim 8, the operations further comprising:
evaluating the command to determine whether to execute the command locally at the system or to provide the command for execution at the upgrader device.

13. The system of claim 8, the operations further comprising:
receiving a second command;
determining that the speed of the wireless network connection is less than the threshold; and
executing the second command at the system based on the determination that the speed of the wireless network connection is less than the threshold.

14. The system of claim 13, the operations further comprising:
providing a visual notification that the system is operating in a normal mode of operation based on the determination that the speed of the wireless network connection is less than the threshold.

15. A non-transitory computer-readable medium having instructions stored thereon that, when executed by at least one computing device, cause the at least one computing device to perform operations comprising:
determining that the at least one computing device is connected to an upgrader device over a wireless network connection, wherein the upgrader device includes hardware capabilities for processing content beyond capabilities of the at least one computing device, and wherein during an upgrader mode of the at least one computing device, at least a portion of a functionality of the at least one computing device is executed by the upgrader device;
receiving a command at the at least one computing device;
determining that a speed of the wireless network connection exceeds a threshold;
transmitting the command to the upgrader device based on both the determination that the upgrader mode is active and the determination that the speed of the wireless network connection exceeds the threshold;
receiving, at the at least one computing device, a response from the upgrader device executing the command; and
executing the received response at the at least one computing device, wherein the received response directs the at least one computing device to output at least a portion of the content.

16. The non-transitory computer-readable medium of claim 15, wherein the content comprises streaming video game content.

17. The non-transitory computer-readable medium of claim 15, wherein the content comprises only audio content.

18. The non-transitory computer-readable medium of claim 15, wherein the upgrader device includes additional or faster memory relative to the at least one computing device.

19. The non-transitory computer-readable medium of claim 15, the operations further comprising:
evaluating the command to determine whether to execute the command locally at the at least one computing device or to provide the command for execution at the upgrader device.

20. The non-transitory computer-readable medium of claim 15, the operations further comprising:
receiving a second command;
determining that the speed of the wireless network connection is less than the threshold; and
executing the second command at the at least one computing device based on the determination that the speed of the wireless network connection is less than the threshold.

* * * * *